United States Patent Office 3,252,778
Patented May 24, 1966

3,252,778
METHOD OF MAKING A HIGH STRENGTH SEMICRYSTALLINE ARTICLE
Philip Goodman, Lexington, Mass., and Charles B. King, Corning, N.Y.
Filed Feb. 26, 1964, Ser. No. 347,501
7 Claims. (Cl. 65—33)

This application is a continuation-in-part of the pending application, Serial No. 58,549, filed September 26, 1960, now abandoned.

This invention relates to the production of semicrystalline ceramic articles by the controlled crystallization of glass articles by heat treatment and particularly to a novel method of making a semicrystalline article having a relatively high modulus of rupture, sometimes called flexural strength, from articles of glass comprising primarily $SiO_2$, MgO, $Al_2O_3$, and $TiO_2$ in which the $TiO_2$ promotes the crystallization.

Glass articles having such compositions may be converted by suitable heat treatments to semicrystalline articles which are characterized in general by higher moduli of rupture and higher deformation temperatures than those of the original glass articles, as is shown in U.S. Patent No. 2,920,971. While such articles have great utility for many applications, it would be extremely desirable to be able to obtain articles with greater strengths while at the same time possessing thermal expansion coefficients compatible with common structural metals, preferably steel.

One object of this invention is to produce a semicrystalline ceramic article which has a high modulus of rupture and a thermal expansion coefficient, as measured between 0° C. and 300° C., of between about $100 \times 10^{-7}/°$ C. and $120 \times 10^{-7}/°$ C.

Another object of this invention is to produce a semicrystalline ceramic articles which can be utilized in a composite body comprising steel elements.

Figure 1:
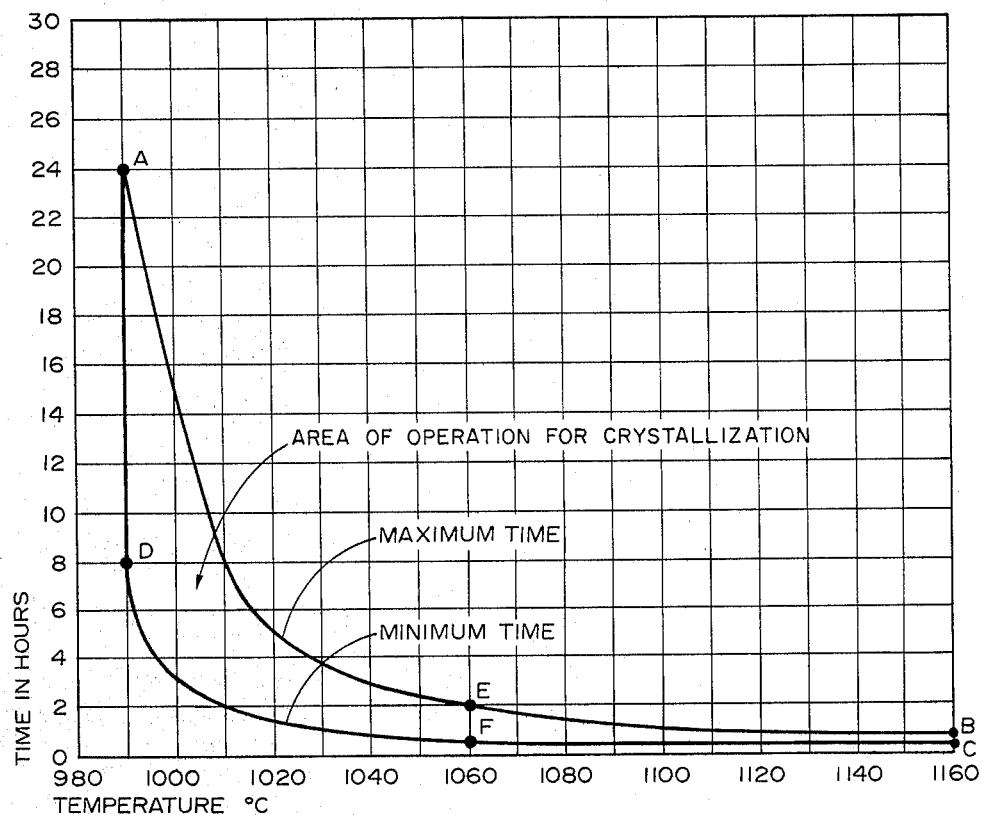
Figure 2:
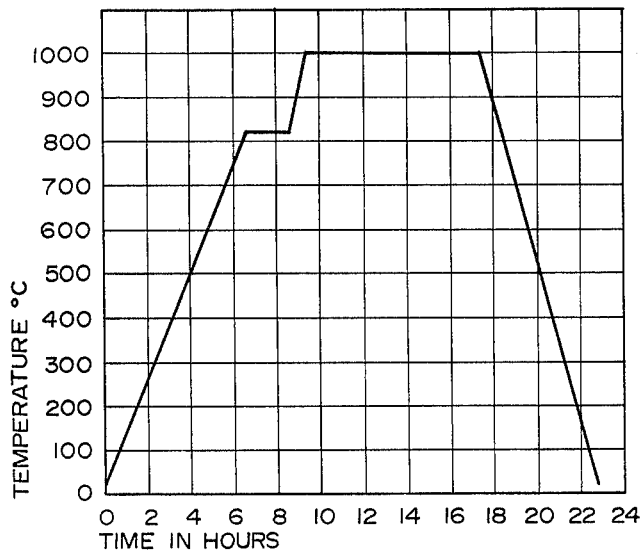
Figure 3:
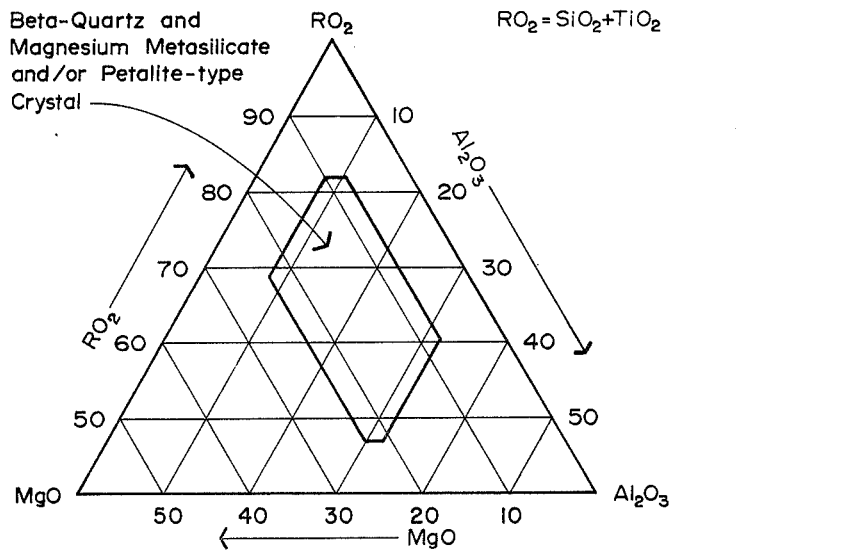

In order to make the description of the method of this invention more clear, the following drawings are included wherein:

FIGURE 1 is a graphic representation of the broadest parameters of the instant heat treating procedure;

FIGURE 2 sets forth a time-temperature curve for a specific embodiment of the method disclosed herein; and FIGURE 3 represents a phase diagram setting out the glass compositions suitable for this invention and the crystal phases developed in the heat treating process.

We have now found that articles of glass consisting essentially by weight of about 40–68% $SiO_2$, 8–32% $Al_2O_3$, 7–14% $TiO_2$, and 8.5–23% MgO can be converted to a semicrystalline body having a coefficient of thermal expansion in the aforementioned range and a modulus of rupture in excess of 40,000 p.s.i. when subjected to a heat treatment in the temperature range of 990° C. to 1160° C. for times as defined by the area A–B–C–D–E–F–G–H–I–J–K–L–M–N–A in FIGURE 1.

As is shown in the above-mentioned patent, glasses consisting of MgO, $Al_2O_3$, $TiO_2$, and $SiO_2$ in the aforementioned ranges, when heat-treated at the higher temperatures set forth therein, result in semicrystalline bodies having thermal expansion coefficients of between $14 \times 10^{-7}/°$ C. and $63 \times 10^{-7}/°$ C. and strengths ranging up to a maximum of 37,500 p.s.i.

However, the herein described heat treatment produces a semicrystalline article containing what is believed to be beta-quartz as the major crystalline phase, as well as minor amounts of other crystalline phases believed to be magnesium metasilicate and/or a petalite-type crystal, and additionally produces a thin compression layer on the surface of the article.

As is common with thermally-induced chemical reactions, there is an interdependence of time and temperature. This interdependence of time and temperature is demonstrated in FIGURE 1 wherein the maximum and minimum times of heat treatment at any specific temperature within the crystallization range are delineated generally by curves A–B–C–D–E–F–G and N–M–L–K–J–I–H, respectively. It will be appreciated that some flexibility is inherent in any process whose mechanism is based upon a time-temperature relationship and, therefore, the paths of these curves cannot be taken to constitute an absolute measure but only as representing a calculated approximation of effective heat treatments as determined through laboratory experimentation. As these curves illustrate, at the lower or cooler end of the crystallization range there is a fairly broad range of times which can be utilized to produce the desired semicrystalline ceramic bodies. The time of crystallization must be sufficient to yield a highly crystalline body to insure the high strength demanded. However, excessively long periods of crystallization, besides being uneconomical commercially, lead to the conversion of the desired high expansion crystallization to corderite or other low expansion crystal phases. Such bodies do not have the high modulus of rupture and the thermal expansion coefficient of between about $100 \times 10^{-7}/°$ C. and $120 \times 10^{-7}/°$ C. which are produced by the present invention. Finally, there is a maximum time for exposure of the article to temperatures within the heat treatment zone to forestall spalling of the surface layer upon cooling. At the upper end of the crystallization range the speed of crystal formation is much greater and the heat treating times must be carefully controlled to insure a satisfactory semicrystalline ceramic body. Examples of the maximum and minimum heat treating times determined experimentally are set out in Table I.

Table I

MAXIMUM TIMES

| | Hours |
|---|---|
| Point A, 990° C. | About 24 |
| Point B, 1000° C. | About 15 |
| Point C, 1010° C. | About 8 |
| Point D, 1020° C. | About 5 |
| Point E, 1040° C. | About 3 |
| Point F, 1060° C. | About 2 |
| Point G, 1160° C. | About ½ |

MINIMUM TIMES

| Point N, 990° C. | About 8 |
|---|---|
| Point M, 1000° C. | About 3 |
| Point L, 1010° C. | About 2 |
| Point K, 1020° C. | About 1½ |
| Point J, 1040° C. | About 1 |
| Point I, 1060° C. | About ½ |
| Point H, 1160° C. | About ¼ |

Of course, it is obvious that the temperature of the ultimate heat treatment according to this invention does not require that the article be held at a single temperature within the crystallization range for the duration of the heat treatment, but may be heated at several temperatures within the ranges for a fractional part of the operable time or may even be heated at a uniform rate through the whole or substantial part of the range. For example, a satisfactory crystallization heat treatment comprises heating the articles at a rate of ½° C. per minute from 990° C. to 1040° C., to 1050° C., or 1060° C. and then withdrawing them from the heating apparatus to room temperature or placing them in an annealing furnace wherein their temperature is reduced to room temperature from about 600° C. in 10 hours.

The compositions amenable to the present process are those glasses which crystallize to a semicrystalline ceramic body containing corderite as the principal crystalline phase when heat treated in the manner described in the aforementioned patent. Examples of such compositions are illustrated in Table II in which the constituents are set forth in percent by weight on the oxide basis as calculated from the batch.

*Table II*

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 42.8 | 45.8 | 45.5 | 50.2 | 52.5 | 56.0 | 57.8 | 58.1 | 60.4 | 64.2 | 67.5 | 46.7 | 45.2 | 54.6 |
| $Al_2O_3$ | 30.2 | 25.3 | 30.5 | 26.5 | 26.5 | 20.0 | 8.9 | 19.1 | 21.4 | 13.8 | 12.5 | 28.9 | 29.5 | 19.1 |
| $TiO_2$ | 13.0 | 11.1 | 11.5 | 11.4 | 9.1 | 9.0 | 11.1 | 9.1 | 9.1 | 8.2 | 11.1 | 10.2 | 10.8 | 9.1 |
| MgO | 14.0 | 17.8 | 12.5 | 11.9 | 11.9 | 15.0 | 22.2 | 13.7 | 9.1 | 13.8 | 8.9 | 13.3 | 10.4 | 10.9 |
| $Li_2O$ |  |  |  |  |  |  |  |  |  |  |  | 0.9 |  |  |
| $K_2O$ |  |  |  |  |  |  |  |  |  |  |  |  | 1.8 |  |
| F |  |  |  |  |  |  |  |  |  |  |  |  | 2.3 |  |
| BaO |  |  |  |  |  |  |  |  |  |  |  |  |  | 4.5 |
| $ZrO_2$ |  |  |  |  |  |  |  |  |  |  |  |  |  | 1.8 |

The glasses having compositions as set forth in Table II can be melted in a conventional manner from batches in tanks, pots, or crucibles at temperatures of about 1500–1600° C. and then formed into articles of the desired shape by well-known glass techniques, such as blowing, pressing, drawing, casting and the like. The shaped glass article is thereafter converted to a semicrystalline body by heat treatment thereof. In most instances, the glass article is cooled to room temperature to permit inspection thereof but where fuel economics and speed of production are desired, the melt may be cooled only to its transformation point and then immediately subjected to heat treatment. The transformation point is defined as that temperature at which the liquid melt becomes an amorphous solid, this temperature being in the vicinity of the annealing point of the glass, around 700° C. for the compositions involved herein.

A suitable heat-treatment according to this invention comprises heating an article of glass having the composition of Example 6 from room temperature to 1000° C. at a rate of 7° C. per minute, maintaining the article at 1000° C. for 8 hours, and thereafter cooling it to room temperature.

However, we have found that more desirable results, such as higher strengths and less change in shape of the article, are obtained by exposing the glass article to an intermediate temperature range of between 720° C. and 990° C. for at least 90 minutes before exposure to the crystallization temperatures.

Nevertheless, although a two-step heat treating cycle is preferred, very satisfactory products can be produced when the glass body is heated at a constant rate from room temperature or the transformation range to temperatures within the 990° C.–1160° C. zone. The body is then held at a specific temperature for a period of time to assure the attainment of the desired crystallization.

The rate of heating to the crystallization temperature which can be tolerated is generally founded on two factors: the ability of the glass body to resist thermal shock and the speed of crystallization within the body. The comparatively low thermal expansion coefficients of the $MgO \cdot Al_2O_3 \cdot SiO_2$ glasses of this invention give them such resistance to thermal shock that this factor is not of much importance when compared with the second factor. In the production of semicrystalline ceramic bodies, as is explained in Patent No. 2,920,971, the glass body is heated above the transformation point to initiate crystallization after which the body is commonly raised to a still higher temperature to increase the crystallization. The softening point and, hence, the deformation temperature of the semicrystalline body is considerably higher than the base glass. It can be seen, then, that the rate of heating the glass body must be balanced against the speed at which crystals are developed within the body. Too rapid heating will not allow the formation of sufficient crystals to support the body and slumping will occur. Although heating rates of about 10° C./min. have been utilized successfully, we prefer rates of less than about 5° C./min. At these slower rates, semicrystalline bodies having very little, if any, deformation have been produced throughout the whole field of base glass compositions.

More specifically, a wide variety of heat-treatments according to this invention were carried out on articles of glass having the composition set forth in Example 6. These heat treatments and the results thereof are set forth in Table III.

*Table III*

| H.T. No. | Temp. (° C.) | Hold (Hrs.) | Temp. (° C.) | Hold (Hrs.) | Exp. Coef. (° C.×10⁷) | M.O.R. (p.s.i.) |
|---|---|---|---|---|---|---|
| 1 | 820 | 2 | 1,010 | 8 | 114 | 50,000 |
| 2 | 820 | 2 | 990 | 8 | 110 | 41,600 |
| 3 | 820 | 2 | 1,000 | 8 | 116 | 50,500 |
| 4 | 820 | 2 | 1,010 | 8 | 117 | 40,000 |
| 5 | 820 | 2 | 1,000 | 7 | 116 | 47,000 |
| 6 | 820 | 2 | 1,000 | 9 | 123 | 52,000 |
| 7 | 820 | 0 | 1,000 | 4 | 109 | 42,000 |
| 8 | 820 | 0 | 1,000 | 8 | 114 | 45,500 |
| 9 | 820 | 0 | 1,000 | 12 | 120 | 48,000 |
| 10 | 820 | 0 | 1,000 | 14 | 113 | 63,000 |
| 11 | 820 | 2 | 1,000 | 8 | 118 | 44,400 |
| 12 | 820 | 2 | 1,000 | 8 | 122 | 44,600 |
| 13 | 700 | 0 | 1,160 | ¼ | 117 | 56,900 |

The heating rates for the thermal treatments given in Table III are as follows.

Nos. 1–10:
 Room temperature to 820° C.—2° C. per minute
 820° C. to upper hold temperature—4° C. per minute
 Upper hold temperature to room temperature—3° C. per minute No. 11:
 All heating rates—1° C. per minute
 Cooling from 1000° C.—3° C. per minute No. 12:
 All heating rates—7° C. per minute
 Cooling from 1000° C.—3° C. per minute No. 13:
 Room temperature to 700° C.—5° C. per minute
 700° C. directly into furnace preheated to 1160° C.
 Removed from furnace to room temperature Similar glass articles were also heat treated by heating them from room temperature to 820° C. at 2° C. per minute, holding them at 820° C. for 2 hours, heating them to 980° C. at 2° C. per minute, and thereafter heating them at ½° C. per minute and thereafter removing the articles at predetermined temperatures. The articles thus heat treated and removed at 1040° C., 1050° C., and 1060° C. had moduli of rupture of 47,000 p.s.i., 48,900 p.s.i., and 46,500 p.s.i., respectively.

The modulus of rupture preferably is measured in the conventional manner by supporting individual rods of the semicrystalline product about ¼-inch square in cross section and 4 inches long on 2 knife edges spaced ½-inch apart and loading them on 2 downwardly acting knife edges about ¾-inch apart and centrally spaced from the lower knife edges until breakage of the bars occurs. To ensure comparable results, the bars are first abraded by being sandblasted by a stream of air at 15 p.s.i.g. pressure containing −65 +100 mesh sand. Abraded bars of annealed glass in general, when treated and measured in this manner show moduli of rupture ranging from 5000 to 6000 p.s.i.

The method of measuring the linear thermal expansion coefficients of glasses and semicrystalline ceramics is so well known as to require no discussion here.

The reason for the unusual behavior of these glass articles heat treated according to the presently described process apparently is the result of the crystallization in the interior portion of the article of an intermediate phase during heat-treatment within the 990° C. and 1160° C. temperature range. This intermediate phase has a relatively high expansion coefficient, while a lower expansion phase is present on the surface of the article resulting in compressive forces in the surface of the article upon the completion of the treatment. This intermediate phase apparently is formed and thereafter transformed into the ultimate corderite phase, final conversion taking place more rapidly as the temperature of heat treatment is increased. Therefore, heat treatments involving temperatures in excess of 1160° C. or at lower temperatures but of longer duration than specified herein result in bodies having corderite as the major crystalline phases. Additionally, it has been observed that when the treatment time and/or temperatures are only slightly in excess of those specified, the articles so treated spall upon cooling. However, temperatures and/or times substantially exceeding those stated herein produce an article which has the characteristics described in the above-mentioned patent. Furthermore, it appears that a temperature of at least 990° C. is necessary to promote the formation of this intermediate phase, at least within practical times.

While the above described heat treatments are satisfactory for producing articles with the described characteristics, it is desirable to utilize heat-treatment schedules with temperatures not in excess of 1060° C. as defined by area A—B—C—D—E—F—G—H—I—J—K—L—M—N—A. As can be seen from FIGURE 1 in which graphs of the maximum and minimum times of heat-treatment are plotted for any temperature in the operable range, temperatures in excess of 1060° C. require very close control of the time of heat-treatment. While such control is not exceedingly difficult for articles having thin cross-sections, that is up to about ¼-inch, articles with thicker walls require substantial times to reach thermal equilibrium when placed in a furnace at elevated temperatures as well as being less able to withstand thermal shocks. Thus, while the surface of an article would attain the temperature of the furnace almost immediately, the interior would heat up more slowly due to the comparatively low thermal conductivity of the material. However, schedules utilizing such higher temperatures are advantageous for producing flat plates in a process wherein glass plates are passed on a continuous belt through a kiln operating near the higher end of such temperature range, preferably 1150° C. and are thereby rapidly converted to the desired semicrystalline state.

The preferred heat treatment is set forth in No. 3 of Table III inasmuch as it results in a high strength which does not vary substantially with either minor changes in the time at which it is held at the upper temperature or with temperature differences of the nature found in commercial heat treatment equipment. While the heat treatment of No. 10 produces high-strength, it requires a long hold at the upper hold temperature, which is much closer to the maximum time which is suitable for this process. Furthermore, it has been found that while it is desirable that the article be exposed to temperatures between 720° C. and 990° C. for at least 90 minutes, longer times, and particularly about 2 hours at 820° C., within this region are beneficial in that it reduces the deformation of the article occurring in the crystallization region.

In general the most desirable results, from the standpoint of strength, thermal expansion coefficient, deformation, and practical production considerations, are obtained by exposing an article of glass in the above defined composition range to a nucleation temperature of about 820° C. for two hours and thereafter to a crystallization temperature of 1000°–1010° C. for about 6–8 hours.

The rates at which the article is heated to 720° C. or cooled from the ultimate crystallization temperature do no appear to have any significant effect on the results achieved, but, of course, must not be so rapid as to cause thermal breakage of the article. As the glasses have thermal expansion coefficients of between about $$30 \times 10^{-7}/°C.$$

and $40 \times 10^{-7}/°C.$ between 0°C. and 300° C., they may be heated quite rapidly to 720° C., depending on the wall thickness of the article but the final crystalline product, having a relatively high expansion coefficient, can not be cooled rapidly from the heat treatment temperature unless it has extremely thin walls. Therefore, we commonly utilize cooling rates of less than about 10° C./minute and, desirably, less than about 5° C./minute.

FIGURE 2 represents a time-temperature curve for our preferred heat treatment as set forth in No. 3 of Table III. Thus, after the proper glass-forming batch had been melted at about 1600° C., the melt simultaneously cooled and formed into a glass article of a desired shape, and the glass article then cooled to room temperature for inspection, this article was subsequently subjected to the following heat treatment; the temperature was raised at about 2° C./min. to 820° C., maintained thereat for 2 hours, thereafter the temperature was raised as 4°C./min. to 1000° C., maintained thereat for 8 hours, after which the article was cooled to room temperature at 3° C./min.

FIGURE 3 represents a phase diagram setting forth the crystal phases present in the semicrystalline ceramic article resulting from the process of the invention utilizing a three-component system $MgO \cdot Al_2O_3 \cdot RO_2$, wherein $RO_2$ denotes the total amount of $SiO_2 + TiO_2$.

We claim:
1. A method of manufacturing a semicrystalline ceramic body possessing a modulus of rupture when abraded of at least about 40,000 p.s.i. and a linear thermal expansion coefficient of between about 100 and $120 \times 10^{-7}/°$ C. which comprises melting a glass-forming composition consisting essentially, by weight, of about 40–68% $SiO_2$, 8–32% $Al_2O_3$, 7–14% $TiO_2$, and 8.5–23% MgO, simultaneously cooling the melt at least below the transformation point of said melt and forming a glass shape therefrom, thereafter heating the glass shape to a temperature of between 990° C. and 1160° C. for a time as defined by the area A–B–C–D–E–F–G–H–I–J–K–L–M–N–A in FIGURE 1 to obtain the desired crystallization, and then cooling said shape to room temperature.

2. A method of manufacturing a semicrystalline ceramic body possessing a modulus of rupture when abraded of at least about 40,000 p.s.i. and a linear thermal expansion coefficient of between about 100 and $120 \times 10^{-7}/°$ C. which comprises melting a glass-forming composition consisting essentially, by weight, of about 40–68% $SiO_2$, 8–32% $Al_2O_3$, 7–14% $TiO_2$, and 8.5–23% MgO, simultaneously cooling the melt at least below the transformation point of said melt and forming a glass shape therefrom, thereafter raising the temperature of said shape at a rate not exceeding about 10°/minute to a temperature between about 990° C. and 1160° C. for a time as defined by the area A–B–C–D–E–F–G–H–I–J–K–L–M–N–A in FIGURE 1 to obtain the desired crystallization, and then cooling said shape to room temperature at a rate not exceeding about 10° C./minute.

3. A method according to claim 2 wherein the major crystallization obtained is beta-quartz and the minor crystallization obtained consists of at least one crystalline phase selected from the group consisting of magnesium metasilicate and petalite-type crystal.

4. A method of manufacturing a semi-crystalline ceramic body possessing a modulus of rupture when abraded of at least about 40,000 p.s.i. and a linear thermal expansion coefficient of between about 100 and $120 \times 10^{-7}/°$ C. which comprises melting a glass-forming composition consisting essentially, by weight, of about 40–68% $SiO_2$, 8–32% $Al_2O_3$, 7–14% $TiO_2$, and 8.5–23% MgO, simultaneously cooling the melt at least below the transformation point of said melt and forming a glass shape therefrom, thereafter heating the glass shape to a temperature of 720° C., raising the temperature of the shape from 720° C. to 990° C. in a minimum time of 90 minutes, subsequently exposing the shape to a temperature of between 990° C. and 1160° C. for a time as defined by the area A–B–C–D–E–F–G–H–I–J–K–L–M–N–A in FIGURE 1 to obtain the desired crystallization, and then cooling the shape to room temperature.

5. A method of manufacturing a semicrystalline ceramic body possessing a modulus of rupture when abraded of at last 40,000 p.s.i. and a linear thermal expansion coefficient of between about 100 and $120 \times 10^{-7}/°$ C. which comprises melting a glass-forming composition consisting essentially, by weight, of about 40–68% $SiO_2$, 8–32% $Al_2O_3$, 7–14% $TiO_2$, and 8.5–23% MgO, simultaneously cooling the melt at least below the transformation point of said melt and forming a glass shape therefrom, thereafter heating the glass shape to a temperature between 990° C. and 1160° C. for a time ranging from at least about 8 hours at the lower of said temperatures to about ¼ hour at the higher of said temperatures but not longer than about 24 hours at the lower of said temperatures to about ½ hour at the higher of said temperatures to obtain the desired crystallization, and then cooling said shape to room temperature.

6. A method of manufacturing a semicrystalline ceramic body possessing a modulus of rupture when abraded of at least about 40,000 p.s.i. and a linear thermal expansion coefficient of between about 100 and $120 \times 10^{-7}/°$ C. which comprises melting a glass-forming composition consisting essentially, by weight, of about 40–68% $SiO_2$, 8–32% $Al_2O_3$, 7–14% $TiO_2$, and 8.5–23% MgO, simultaneously cooling the melt at least below the transformation point of said melt and forming a glass shape therefrom, thereafter raising the temperature of said shape at a rate not exceeding about 10° C./minute to a temperature between 990° C. and 1160° C. for a time ranging from at least about 8 hours but not more than about 24 hours at the lower of said temperatures to at least about ¼ hour but not more than about ½ hour at the higher of said temperatures to obtain the desired crystallization, and then cooling said shape to room temperature at a rate not exceeding about 10° C./minute.

7. A method according to claim 6 wherein the major crystallization obtained is beta-quartz and the minor crystallization obtained consists of at least one crystalline phase selected from the group consisting of magnesium metasilicate and petalite-type crystal.

References Cited by the Examiner

UNITED STATES PATENTS 2,920,971   1/1960   Stookey.
3,146,114   8/1964   Kivlighn _____ 65—33 X

FOREIGN PATENTS 219,667   5/1957   Australia.

DONALL H. SYLVESTER, *Primary Examiner.*

F. W. MIGA, *Assistant Examiner.*